US012734664B2

(12) United States Patent
Mandel et al.

(10) Patent No.: US 12,734,664 B2
(45) Date of Patent: Sep. 15, 2026

(54) IMPACT MECHANISM ARRANGEMENT

(71) Applicant: Hilti Aktiengesellschaft, Schaan (LI)

(72) Inventors: Ulrich Mandel, Buchloe Honsolgen (DE); Josef Fünfer, Koenigsbrunn (DE)

(73) Assignee: Hilti Aktiengesellschaft, Schaan (LI)

( * ) Notice: Subject to any disclaimer, the term of this patent is extended or adjusted under 35 U.S.C. 154(b) by 463 days.

(21) Appl. No.: 17/771,799

(22) PCT Filed: Nov. 6, 2020

(86) PCT No.: PCT/EP2020/081266

§ 371 (c)(1),
(2) Date: Apr. 25, 2022

(87) PCT Pub. No.: WO2021/094213

PCT Pub. Date: May 20, 2021

(65) Prior Publication Data

US 2022/0388137 A1 Dec. 8, 2022

(30) Foreign Application Priority Data

Nov. 15, 2019 (EP) .................................... 19209441

(51) Int. Cl.
*B25D 11/00* (2006.01)
*B25D 17/06* (2006.01)
*B25D 17/24* (2006.01)

(52) U.S. Cl.
CPC ............ *B25D 11/005* (2013.01); *B25D 17/06* (2013.01); *B25D 17/24* (2013.01);
(Continued)

(58) Field of Classification Search
CPC ...... B25D 11/005; B25D 17/06; B25D 17/24; B25D 2211/068; B25D 2217/0015;
(Continued)

(56) References Cited

U.S. PATENT DOCUMENTS 2,685,274 A * 8/1954 Liddicoat .............. B25D 17/08 267/293
4,476,941 A 10/1984 Buck et al.
(Continued)

FOREIGN PATENT DOCUMENTS

CH 659792 A5 2/1987
CN 102046334 A 5/2011
(Continued)

OTHER PUBLICATIONS

U.S. Appl. No. 17/771,658, filed Apr. 25, 2022, which is a national phase application of the International application PCT/EP2020/081267 published as WO2021094214 A1.
(Continued)

*Primary Examiner* — Shelley M Self
*Assistant Examiner* — David G Shutty
(74) *Attorney, Agent, or Firm* — Davidson Kappel LLC

(57) ABSTRACT

Hammer drill and/or chipping hammer (100) having a drive motor (70), an impact mechanism (10) and a tool fitting (50) for fitting a tool (110), wherein the impact mechanism (10) has an anvil (30) that is axially displaceable in an anvil guide (20) and acts on the tool (110), wherein the impact mechanism (10) is equipped with an idle-strike damper element (11) and a rebound-strike damper element (13), wherein the idle-strike damper element (11) and/or the rebound-strike damper element (13) is/are integrated on the anvil (30).

16 Claims, 2 Drawing Sheets

(52) U.S. Cl.
CPC .................... *B25D 2211/068* (2013.01); *B25D 2217/0015* (2013.01); *B25D 2217/0019* (2013.01); *B25D 2222/57* (2013.01); *B25D 2250/235* (2013.01)

(58) Field of Classification Search
CPC ........ B25D 2217/0019; B25D 2222/57; B25D 2250/235
See application file for complete search history.

(56) References Cited

U.S. PATENT DOCUMENTS

| | | | | |
|---|---|---|---|---|
| 4,798,249 A * | 1/1989 | Hoereth | B25D 11/005 173/200 |
| 7,383,893 B2 * | 6/2008 | Shimma | B25D 17/24 173/104 |
| 7,383,895 B2 * | 6/2008 | Aoki | B25D 17/24 173/210 |
| 7,806,201 B2 * | 10/2010 | Aoki | B23D 51/16 173/210 |
| 7,878,265 B2 * | 2/2011 | Aoki | B25D 17/06 173/210 |
| 7,950,471 B2 * | 5/2011 | Loeffler | B25D 11/005 173/104 |
| 8,720,599 B2 * | 5/2014 | Ikuta | B25D 17/24 173/164 |
| 8,991,517 B2 * | 3/2015 | Sugiyama | B25D 17/24 173/211 |
| 2002/0125023 A1 * | 9/2002 | Hanke | B25D 17/088 173/128 |
| 2008/0029283 A1 | 2/2008 | Hammerstingl et al. | |
| 2008/0217040 A1 | 9/2008 | Loeffler et al. | |
| 2011/0073339 A1 | 3/2011 | Werner et al. | |
| 2019/0118363 A1 | 4/2019 | Fuenfer et al. | |

FOREIGN PATENT DOCUMENTS

| | | | | |
|---|---|---|---|---|
| CN | 103786136 A | 5/2014 | |
| CN | 209557569 U | 10/2019 | |
| DE | 102006046472 A1 * | 4/2008 | B25D 16/00 |
| EP | 0663270 A1 | 7/1995 | |
| EP | 1238759 A1 | 9/2002 | |
| EP | 1479485 A1 | 11/2004 | |
| EP | 1886767 A2 | 2/2008 | |
| EP | 2199031 A1 | 6/2010 | |
| EP | 2314420 A1 * | 4/2011 | B25D 17/06 |
| GB | 618546 A | 2/1949 | |
| GB | 2458523 A * | 9/2009 | B25D 11/005 |
| WO | WO 2009036526 A1 | 3/2009 | |
| WO | WO 2015/000129 A1 | 1/2015 | |
| WO | WO 2021/094213 A1 | 5/2021 | |
| WO | WO 2021/094214 A1 | 5/2021 | |
| WO | WO2021094117 A1 | 5/2021 | |

OTHER PUBLICATIONS

U.S. Appl. No. 17/771,799, filed Apr. 25, 2022, which is a national phase application of the International application PCT/EP2020/081266 published as WO2021/094213.
U.S. Appl. No. 17/368,381, filed Apr. 12, 2022, which is a national phase application of the International application PCT/EP2020/080640 published as WO2021094117 A1.
International Search Report of PCT/EP2020/081266, Feb. 8, 2021.
International Search Report of PCT/EP2020/081267, Feb. 8, 2021.

* cited by examiner

IMPACT MECHANISM ARRANGEMENT

The present invention relates to a hammer drill and/or chipping hammer having a drive motor, an impact mechanism and a tool fitting for fitting a tool. The impact mechanism has an anvil that is axially displaceable in an anvil guide and acts on the tool. The impact mechanism is equipped with an idle-strike damper element and a rebound-strike damper element.

BACKGROUND

Hammer drills of the type mentioned at the beginning are known in principle from the prior art.

Idle-strike damper elements and rebound-strike damper elements, which are preferably in the form of elastomer damping elements, are used in order to keep force peaks on downstream components and vibrations as low as possible. When the impact mechanism is at the working point, the anvil butts, after each strike, against a typically provided rebound-strike disk and this is absorbed by the rebound-strike damping element.

SUMMARY OF THE INVENTION

In the event of too low a pressing force or the breaking away of concrete/stone to be worked on, idle strikes can occur. This means that strikes with full impact energy have to be absorbed by the hammer and in particular the tool fitting itself. In order to protect the downstream components from a force peak of the idle strike, use is typically made of an idle-strike damping element. Idle-strike damping by the idle-strike damper element influences the return speed of the anvil after an idle strike and thus also the deactivation behavior of the hammer.

It is an object of the present invention to provide a hammer drill and/or chipping hammer in which the impact mechanism has a comparatively simple structure and as a result is comparatively cost-effective.

The present invention provides that the idle-strike damper element and/or the rebound-strike damper element is/are integrated on the anvil. This has the advantage that the anvil together with the idle-strike damper element and/or rebound-strike damper element can be mounted in one working step—and thus in a comparatively inexpensive manner. This also results in an advantageous reduction in components to be kept available, leading in a related manner to a cost reduction.

In a particularly preferred embodiment, the idle-strike damper element and the rebound-strike damper element are formed in one piece with one another as a combined damper element. Thus, idle-strike damping and rebound-strike damping can take place by way of one and the same component. It has been found to be advantageous if the combined damper element is in the form of an elastomer. In a particularly preferred embodiment, the combined damper element has been vulcanized on the anvil. Alternatively or in addition, the combined damper element can be connected to the anvil by a form-fitting connection.

It has been found to be advantageous if the combined damper element is surrounded by a stop sleeve, which is arranged so as to strike an idle-strike stop surface on one side and to strike a rebound-strike stop surface on the other side. The stop sleeve can be spaced apart in a radial direction from the anvil, wherein the elastomer is located preferably in a radial direction between the anvil and stop sleeve.

In a particularly preferred embodiment, the idle-strike stop surface is formed on the tool fitting itself. The rebound-strike stop surface can advantageously be formed on a stop ring comprised by the tool fitting. Alternatively, it is possible to dispense with a stop ring on the rebound-strike side, and the rebound-strike stop surface can be formed directly on the tool fitting.

In a particularly preferred embodiment, the stop ring is supported by an auxiliary rebound-strike damper element with respect to the tool fitting.

It has been found to be advantageous if the impact mechanism has a guide housing, which engages at least partially around the anvil and/or the tool fitting. In a particularly preferred embodiment, the tool fitting is movable in the axial direction relative to the guide housing and/or is arranged at least partially within the guide housing. In a further particularly preferred embodiment, the impact mechanism has an additional idle-strike damper element, which acts preferably between the tool fitting and the guide housing. The impact mechanism may have an additional rebound-strike damper element, which acts preferably between the tool fitting and the guide housing. Force introduction from the tool fitting into the unit made up of the additional idle-strike damper element and additional rebound-strike damper element can take place by way of a peg protruding in a radial direction from the tool fitting. In a particularly preferred embodiment, the peg engages, with respect to the axial direction of the anvil, between the additional idle-strike damper element and additional rebound-strike damper element.

As a result of cooperation of the additional idle-strike damper element and additional rebound-strike damper element, it is possible for the tool fitting to be mounted in a floating manner, with the result that a not inconsiderable part of the impact energy of the anvil can already be attenuated.

Further advantages will become apparent from the following description of the figures. Various exemplary embodiments of the present invention are shown in the figures. The figures, the description and the claims contain numerous features in combination. A person skilled in the art will expediently also consider the features individually and combine them to form useful further combinations.

BRIEF DESCRIPTION OF THE DRAWINGS

In the figures, identical and similar components are denoted by the same reference signs. In the figures.

DETAILED DESCRIPTION

Figure 1:
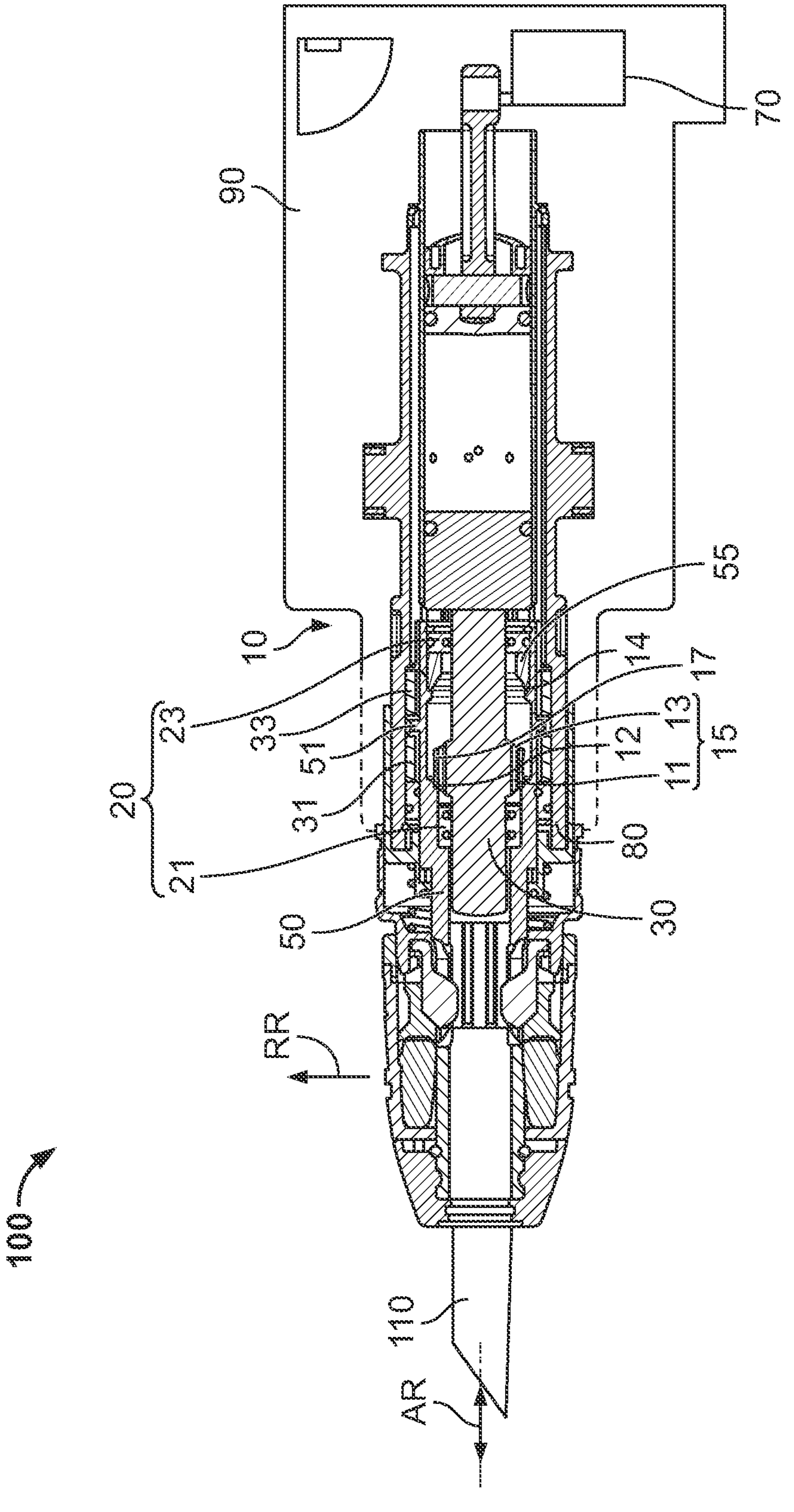
FIG. 1 shows a preferred exemplary embodiment of a hammer drill and/or chipping hammer according to the invention.

A preferred exemplary embodiment of a hammer drill and/or chipping hammer 100 according to the invention is illustrated in FIG. 1. The hammer drill and/or chipping hammer 100 is equipped with a drive motor 70, an impact mechanism 10 and a tool fitting 50 for fitting a tool 110. The impact mechanism 10 and the drive motor 70 are arranged within a housing 90 of the hammer drill and/or chipping hammer 100.

The impact mechanism 10 has an anvil 30 that is displaceable in the axial direction AR in an anvil guide 20 and acts on the tool 110. The anvil guide 20 is realized for example by two rolling bearings 21, 23, which are respectively supported both in a radial direction RR and in the axial direction AR against the tool fitting 50.

The impact mechanism 10 is equipped with an idle-strike damper element 11 and a rebound-strike damper element 13, which are integrated according to the invention on the anvil 30. As is apparent from FIG. 1, the idle-strike damper element 11 and the rebound-strike damper element 13 are formed in one piece with one another and as such form a combined damper element 15. The combined damper element 15 is in the form of an elastomer and has in this case for example been vulcanized on the anvil 30. The combined damper element 15 is surrounded by a stop sleeve 17, which is configured arranged so as to strike an idle-strike stop surface 12 on one side (cf. FIG. 2A) and to strike a rebound-strike stop surface 14 on the other side (cf. FIG. 2B). In this case, the idle-strike stop surface 12 is formed on the tool fitting 50 itself. The rebound-strike stop surface 14 is formed on a stop ring 55 comprised by the tool fitting 50.

As is likewise apparent from FIG. 1, the impact mechanism 10 has a guide housing 80, which engages at least partially around both the anvil 30 and the tool fitting 50. In this case, the tool fitting 50 is movable in the axial direction AR relative to the guide housing 80 and is arranged at least partially within the guide housing 80. The impact mechanism 10 has an additional idle-strike damper element 31, which acts between the tool fitting 50 and the guide housing 80. The impact mechanism is likewise equipped with an additional rebound-strike damper element 33, which acts between the tool fitting 50 and the guide housing 80. As a result of cooperation of the additional idle-strike damper element 31 and additional rebound-strike damper element 33, the tool fitting 50 is mounted in a floating manner with respect to the guide housing 80, with the result that a not inconsiderable part of the impact energy of the anvil can be attenuated. As is apparent from FIG. 1, force introduction from the tool fitting 50 into the unit made up of the additional idle-strike damper element 31 and additional rebound-strike damper element 33 takes place by way of a peg 51 protruding in a radial direction RR from the tool fitting, said peg 51 engaging—with respect to the axial direction-between the additional idle-strike damper element 31 and additional rebound-strike damper element 33.

Figure 2A:
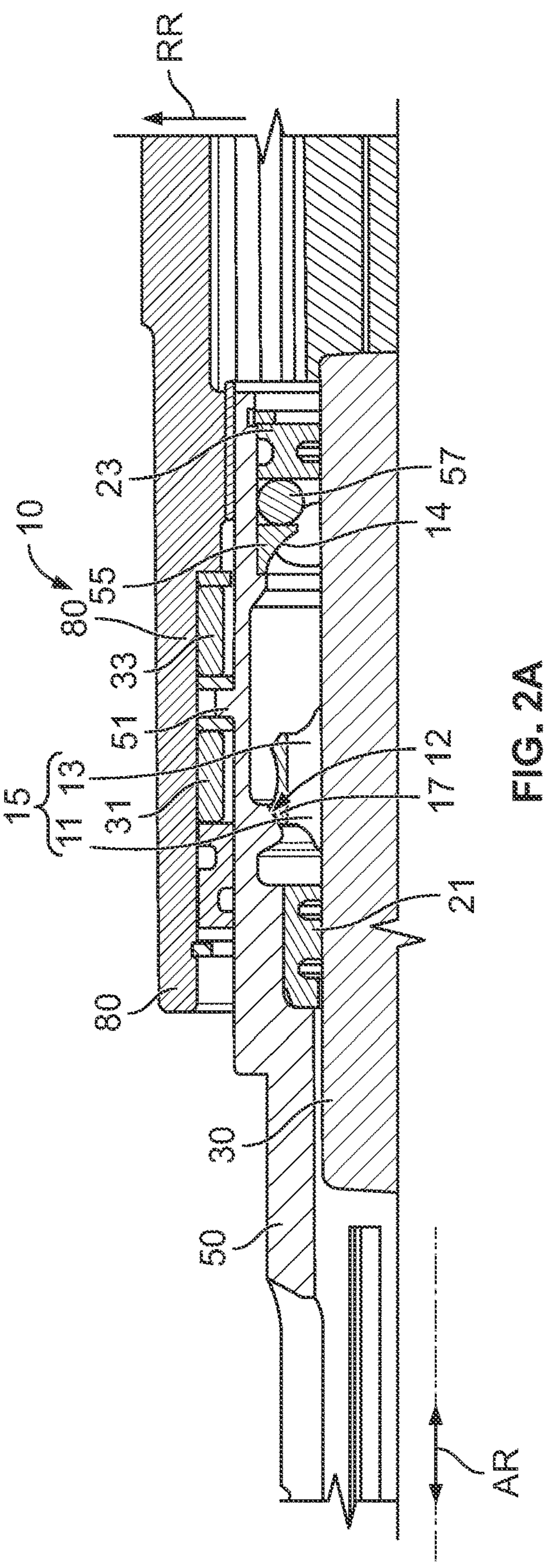
FIGS. 2A and 2B show a preferred exemplary embodiment of an impact mechanism in two states.
Figure 2B:
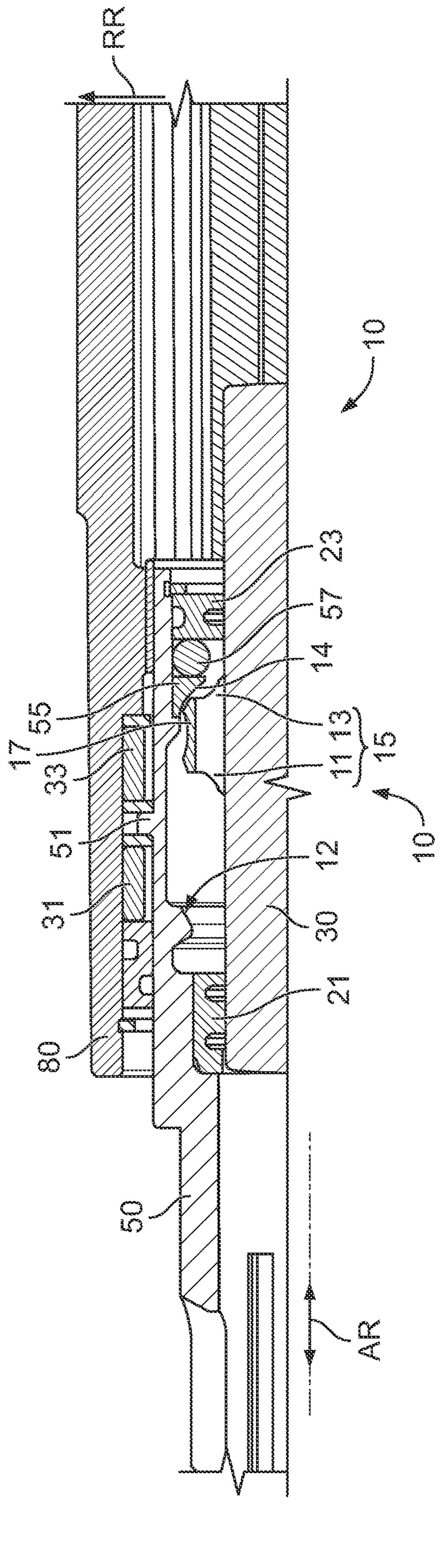

A preferred exemplary embodiment of an impact mechanism 10 is illustrated in FIGS. 2A and 2B. In this case, FIG. 2A shows the moment of an idle strike, i.e. the anvil shown in FIG. 2A is moving toward the left and the stop sleeve 17 surrounding the combined damper element 15 is already in contact with the idle-strike stop surface 12. The idle-strike stop surface 12 is formed on the tool fitting 50 and is located on the side of the stop sleeve that faces the tool 110 (cf. FIG. 1).

FIG. 2B in turn shows the moment of a rebound strike, i.e. the anvil shown in FIG. 2B is moving toward the right and the stop sleeve 17 surrounding the combined damper element 15 is already in contact with the rebound-strike stop surface 14. The rebound-strike stop surface 14 is formed on a stop ring 55 comprised by the tool fitting 50. In this case, the rebound-strike stop surface 14 is located on the side of the stop sleeve 17 that faces away from the tool 110 (cf. FIG. 1).

In contrast to the exemplary embodiment shown in FIG. 1, in the exemplary embodiment in FIGS. 2A and 2B, the stop ring 55 is supported by an auxiliary rebound-strike damper element 57 with respect to the tool fitting 50. By way of the auxiliary rebound-strike damper element 57, a rebound strike (the anvil in FIG. 2B is moving toward the right) can be additionally damped. As is apparent from FIGS. 2A and 2B, the auxiliary rebound-strike damper element 57 is, with respect to the axial direction AR, between the stop ring 55 and that rolling bearing 23 that is located on the side of the stop sleeve 17 that faces away from the tool 110 (cf. FIG. 1).

LIST OF REFERENCE SIGNS

10 Impact mechanism
11 Idle-strike damper element
12 Idle-strike stop surface
13 Rebound-strike damper element
14 Rebound-strike stop surface
15 Combined damper element
17 Stop sleeve
20 Anvil guide
21, 23 Rolling bearing
30 Anvil
31 Additional idle-strike damper element
33 Additional rebound-strike damper element
50 Tool fitting
51 Peg
55 Stop ring
57 Auxiliary rebound-strike damper element
70 Drive motor
80 Guide housing
90 Housing
100 Hammer drill and/or chipping hammer
110 Tool
AR Axial direction
RR Radial direction

What is claimed is:

1. A hammer drill or chipping hammer comprising:

a drive motor;

an impact mechanism; and a tool fitting for fitting a tool, wherein the impact mechanism has an anvil axially displaceable in an anvil guide and acting on the tool, wherein the impact mechanism is equipped with an idle-strike damper element and a rebound-strike damper element, the idle-strike damper element or the rebound-strike damper element being integrated on the anvil;

wherein the impact mechanism has a guide housing engaging at least partially around the anvil or the tool fitting; and wherein the tool fitting is movable in an axial direction relative to the guide housing.

2. The hammer drill or chipping hammer as recited in claim 1 wherein the idle-strike damper element and the rebound-strike damper element are formed in one piece with one another to define a combined damper element.

3. The hammer drill or chipping hammer as recited in claim 2 wherein the combined damper element is in the form of an elastomer.

4. The hammer drill or chipping hammer as recited in claim 3 wherein the combined damper element is vulcanized on the anvil.

5. The hammer drill or chipping hammer as recited in claim 2 wherein the combined damper element is surrounded by a stop sleeve arranged so as to strike an idle-strike stop surface on one side and to strike a rebound-strike stop surface on the other side.

6. The hammer drill or chipping hammer as recited in claim 5 wherein the rebound-strike stop surface is formed on a stop ring comprised by the tool fitting.

7. The hammer drill or chipping hammer as recited in claim 6 wherein the stop ring is supported by an auxiliary rebound-strike damper element with respect to the tool fitting.

8. The hammer drill or chipping hammer as recited in claim 1 wherein the tool fitting is arranged at least partially within the guide housing.

9. The hammer drill or chipping hammer as recited in claim 1 wherein the impact mechanism has an additional rebound-strike damper element acting between the tool fitting and the guide housing.

10. A hammer drill or chipping hammer comprising:

a drive motor;

an impact mechanism; and a tool fitting for fitting a tool, wherein the impact mechanism has an anvil axially displaceable in an anvil guide and acting on the tool, wherein the impact mechanism is equipped with an idle-strike damper element and a rebound-strike damper element, the idle-strike damper element or the rebound-strike damper element being integrated on the anvil;

wherein the combined damper element is surrounded by a stop sleeve arranged so as to strike an idle-strike stop surface on one side and to strike a rebound-strike stop surface on the other side; and wherein the idle-strike stop surface is formed on the tool fitting itself.

11. The hammer drill or chipping hammer as recited in claim 10 wherein the rebound-strike stop surface is formed on a stop ring comprised by the tool fitting.

12. A hammer drill or chipping hammer comprising:

a drive motor;

an impact mechanism; and a tool fitting for fitting a tool, wherein the impact mechanism has an anvil axially displaceable in an anvil guide and acting on the tool, wherein the impact mechanism is equipped with an idle-strike damper element and a rebound-strike damper element, the idle-strike damper element or the rebound-strike damper element being integrated on the anvil;

wherein the impact mechanism has a guide housing engaging at least partially around the anvil or the tool fitting;

wherein the impact mechanism has an additional idle-strike damper element acting between the tool fitting and the guide housing.

13. The hammer drill or chipping hammer as recited in claim 12 wherein the impact mechanism has an additional rebound-strike damper element acting between the tool fitting and the guide housing.

14. The hammer drill or chipping hammer as recited in claim 13 further comprising a peg between the additional idle-strike damper element and the additional rebound-strike damper element.

15. The hammer drill or chipping hammer as recited in claim 14 wherein the peg protrudes radially from the tool fitting.

16. The hammer drill or chipping hammer as recited in claim 14 wherein the peg engages with respect to the axial direction between the additional idle-strike damper element and the additional rebound-strike damper element.

* * * * *